(12) United States Patent
Fischer et al.

(10) Patent No.: US 7,801,907 B2
(45) Date of Patent: Sep. 21, 2010

(54) ASSIGNMENT OF A DISPLAY ORDER TO IMAGES SELECTED BY A SEARCH ENGINE

(75) Inventors: Michael David Fischer, Reading (GB); James Lee West, Oxford (GB)

(73) Assignee: Alamy Limited (GB)

(*) Notice: Subject to any disclaimer, the term of this patent is extended or adjusted under 35 U.S.C. 154(b) by 957 days.

(21) Appl. No.: 11/451,667

(22) Filed: Jun. 13, 2006

(65) Prior Publication Data
US 2007/0288462 A1     Dec. 13, 2007

(51) Int. Cl.
| | |
|---|---|
| G06F 7/00 | (2006.01) |
| G06F 17/30 | (2006.01) |
| G06F 15/167 | (2006.01) |
| G06F 3/16 | (2006.01) |
| G06K 9/54 | (2006.01) |
| G06K 9/60 | (2006.01) |

(52) U.S. Cl. .................. 707/758; 709/213; 715/723; 382/305; 382/284

(58) Field of Classification Search .................. 707/7; 382/305, 284; 715/723
See application file for complete search history.

(56) References Cited

U.S. PATENT DOCUMENTS 5,983,237 A * 11/1999 Jain et al. ................ 707/104.1

(Continued)

FOREIGN PATENT DOCUMENTS

EP     0939338     9/1999

(Continued)

OTHER PUBLICATIONS

Mandis Beigi; A content-Based Meta-Search Engine for Images; 1997; pp. 1-11.*

(Continued)

*Primary Examiner*—Neveen Abel Jalil
*Assistant Examiner*—Jermaine Mincey

(57) ABSTRACT

A method is provided for assigning, to each of a plurality of images within different collections in a group of images selected by a search engine, a position within an order in which the images are to be displayed for viewing. The method comprises assigning an initial handicap value to each collection of images in the group, each collection comprising at least one image of a common origin; calculating a combined ranking score for each image in the group by combining the handicap value of the collection containing the image and a ranking value for the image; selecting, for display in the first position in the order, an image having an optimum combined ranking score relative to the combined ranking scores of the other images in the group; after such image selection step, adjusting the handicap value assigned to the collection from which the selected image has been taken so as to adjust the combined ranking score for each of the remaining images in said collection; and, after such handicap value adjustment step, selecting, for display in the next available position in the order, an image having an optimum combined ranking score relative to the combined ranking scores of the other images remaining in the group. This avoids too many similar looking images being presented in a set of search results and has the effect of spacing out images of the same supplier. This is of benefit to both customers and suppliers in that (i) customers can see images from a wide range of sources whilst any single supplier is prevented from dominating the results, and (ii) suppliers of reasonably equal ranking get a fair chance of having their images displayed in the results.

13 Claims, 5 Drawing Sheets

U.S. PATENT DOCUMENTS

| | | | |
|---|---|---|---|
| 6,970,859 B1* | 11/2005 | Brechner et al. | 707/3 |
| 2002/0078045 A1* | 6/2002 | Dutta | 707/7 |
| 2003/0217057 A1* | 11/2003 | Kuroiwa et al. | 707/7 |
| 2004/0003405 A1 | 1/2004 | Boston | |
| 2004/0091175 A1 | 5/2004 | Beyrouti | |
| 2004/0098399 A1* | 5/2004 | Risberg et al. | 707/100 |
| 2005/0165841 A1 | 7/2005 | Kasperkiewicz | |
| 2005/0185860 A1* | 8/2005 | Denoue et al. | 382/305 |
| 2005/0193083 A1* | 9/2005 | Han et al. | 709/213 |
| 2005/0220361 A1* | 10/2005 | Yamasaki | 382/284 |

FOREIGN PATENT DOCUMENTS

| | | |
|---|---|---|
| EP | 1589444 | 10/2005 |
| GB | 2384129 | 7/2003 |

OTHER PUBLICATIONS

EP Search Report for EP 07109883 dated Oct. 25, 2007; copy consists of 7 unnumbered pages.

* cited by examiner

| POSITION | SUPPLIER A | | | SUPPLIER B | | | SUPPLIER C | | |
|---|---|---|---|---|---|---|---|---|---|
| | H | Ht | CR | H | Ht | CR | H | Ht | CR |
| 0 | 100 | 0 | | 100 | 0 | 10 | 100 | 0 | 10 |
| 1 | 0 | 20 | -10 | 100 | 0 | *10* | 100 | 0 | 10 |
| 2 | 1 | 19 | -9 | 0 | 20 | -10 | 100 | 0 | *-10* |
| 3 | 2 | 18 | *-8* | 1 | 19 | -9 | 0 | 20 | -10 |
| 4 | 0 | 20 | -10 | 2 | 18 | *-8* | 1 | 19 | -9 |
| 5 | 1 | 19 | -9 | 0 | 20 | -10 | 2 | 18 | *-8* |
| 6 | 2 | 18 | *-8* | 1 | 19 | -9 | 0 | 20 | -10 |
| 7 | 0 | 20 | -10 | 2 | 18 | *-8* | 1 | 19 | -9 |
| 8 | 1 | 19 | -9 | 0 | 20 | -10 | 2 | 18 | *-8* |
| 9 | 2 | 18 | *-8* | 1 | 19 | -9 | 0 | 20 | -10 |
| 10 | 0 | 20 | -10 | 2 | 18 | *-8* | 1 | 19 | -9 |

FIG. 4

| HANDICAP COUNT (H) | HANDICAP VALUE (HI) |
| --- | --- |
| 0 | 20 |
| 1 | 19 |
| 2 | 18 |
| 3 | 17 |
| 4 | 16 |
| 5 | 15 |
| 6 | 14 |
| 7 | 13 |
| 8 | 12 |
| 9 | 11 |
| 10 | 10 |
| 11 | 9 |
| 12 | 8 |
| 13 | 7 |
| 14 | 6 |
| 15 | 5 |
| 16 | 5 |
| 17 | 4 |
| 18 | 3 |
| 19 | 2 |
| 20 | 1 |
| 21 | 0 |
| 22 | 0 |
| 23 | 0 |
| 24 | 0 |
| 25 | 0 |
| 26 | 0 |
| 27 | 0 |
| 28 | 0 |
| 29 | 0 |
| 30 | 0 |
| 31 | 0 |
| 32 | 0 |
| 33 | 0 |
| 34 | 0 |
| 35 | 0 |
| 36 | 0 |
| 37 | 0 |
| 38 | 0 |
| 39 | 0 |
| 40 | 0 |
| 41 | 0 |
| 42 | 0 |
| 43 | 0 |
| 44 | 0 |
| 45 | 0 |
| 46 | 0 |
| 47 | 0 |
| 48 | 0 |
| 49 | 0 |
| 50 | 0 |
| 51 | 0 |
| 52 | 0 |
| 53 | 0 |
| 54 | 0 |
| 55 | 0 |
| 56 | 0 |
| 57 | 0 |
| 58 | 0 |
| 59 | 0 |
| 60 | 0 |
| 61 | 0 |
| 62 | 0 |
| 63 | 0 |
| 64 | 0 |
| 65 | 0 |
| 66 | 0 |
| 67 | 0 |
| 68 | 0 |
| 69 | 0 |
| 70 | 0 |
| 71 | 0 |
| 72 | 0 |
| 73 | 0 |
| 74 | 0 |
| 75 | 0 |
| 76 | 0 |
| 77 | 0 |
| 78 | 0 |
| 79 | 0 |
| 80 | 0 |
| 81 | 0 |
| 82 | 0 |
| 83 | 0 |
| 84 | 0 |
| 85 | 0 |
| 86 | 0 |
| 87 | 0 |
| 88 | 0 |
| 89 | 0 |
| 90 | 0 |
| 91 | 0 |
| 92 | 0 |
| 93 | 0 |
| 94 | 0 |
| 95 | 0 |
| 96 | 0 |
| 97 | 0 |
| 98 | 0 |
| 99 | 0 |
| 100 | 0 |

FIG. 5

ASSIGNMENT OF A DISPLAY ORDER TO IMAGES SELECTED BY A SEARCH ENGINE

BACKGROUND OF THE INVENTION

This invention relates to the assignment, to each of a plurality of images within different collections in a group of images selected by a search engine, of a position within an order in which the images are to be displayed for presentation to a user.

In the modern age of data storage and communication, search engines are widely used to identify text-based documents meeting selected criteria. Each document has associated textual data called "metadata", which is typically compiled manually, and the search engine identifies a list of documents corresponding to user-input search terms by matching the search terms to the metadata. Search engine results are presented to the user by displaying a list of the names of the identified documents on a computer monitor or the like. Conventional search engines use algorithms to determine the order in which the identified documents are listed for presentation to a user.

US-A-2002/0123988 describes a known algorithm for ordering a list of text-based documents identified by a search engine in response to input search terms by assigning a score to each document based on usage information. The usage information relates to the number of users that have visited the document.

Image search engines are also used for the sale of products, including the sale of rights in images themselves. For example, photography agencies have benefited from technical advances in digital photography and are able to trade over the Internet as so-called "on-line stock photography agencies". In particular, photography agencies may offer images (photographs, illustrations, moving images and the like) from a "stock" or "bank" of digital images stored in a database, which may be viewed using a search engine, by potential customers throughout the world. As with conventional search engines, an image search engine performs a search on input textual search terms. Thus, each image has associated textual metadata that is manually input and associated with the image. Such metadata may include the author/photographer name, date, colour or keywords for the subject of the image. Thus the metadata associated with an image is more limited than the metadata associated with documents that are primarily text-based.

An image search engine of an on-line stock photography agency produces the search results by displaying the images to the customer in an arbitrary order, determined by a conventional algorithm designed for searching documents. A typical search for images on user-input each terms may reveal hundreds of images, and so groups of about ten "thumbnail" images are typically shown together to the user as a "page" on screen. However, the customer may need to scroll through large numbers of such groups of identified images in order to find an image that suits his or her needs and, when a suitable image is identified, look at the image in greater detail by enlarging the thumbnail image on screen. This makes image searching time consuming, particularly bearing in mind the ever-increasing numbers of images that may be contained in an agency database.

Furthermore attempts to rank images in the search results for presentation to the customer can lead to bias as between images from the collection of one agency and images from the collection of another agency resulting in both limitation in the choice presented to the customer and restriction on the presentation of images of some agency or under some conditions. In particular this can lead to too many similar looking images being presented to a customer as a result of a search.

SUMMARY OF THE INVENTION

The present invention seeks to address the aforementioned limitations.

In accordance with a first aspect, the present invention provides a method of assigning, to each of a plurality of images within different collections in a group of images selected by a search engine, a position within an order in which the images are to be displayed for viewing, the method comprising the following steps:

a) assigning an initial handicap value to each collection of images in the group, each collection comprising at least one image of a common origin;

b) calculating a combined ranking score for each image in the group by combining the handicap value of the collection containing the image and a ranking value for the image;

c) selecting, for display in the first position in the order, an image having an optimum combined ranking score relative to the combined ranking scores of the other images in the group;

d) after such image selection step, adjusting the handicap value assigned to the collection from which the selected image has been taken so as to adjust the combined ranking score for each of the remaining images in said collection; and e) after such handicap value adjustment step, selecting, for display in the next available position in the order, an image having an optimum combined ranking score relative to the combined ranking scores of the other images remaining in the group.

In a preferred embodiment of the invention, in the handicap value adjustment step d), the handicap value assigned to the collection from which the image has been selected is adjusted by being increased to a preset maximum value, for example 20.

Such a method can be applied in such a manner as to avoid too many similar looking images being presented in a set of search results and to have the effect of spacing out images of the same supplier. This is of benefit to both customers and suppliers in that (i) customers can see images from a wide range of sources whilst any single supplier is prevented from dominating the results, and (ii) suppliers of reasonably equal ranking get a fair chance of having their images displayed in the results.

In a preferred embodiment of the invention, in the handicap value adjustment step d), the handicap value assigned to the collection from which the image has been selected is adjusted by being increased to a preset maximum value, for example 20.

Furthermore it is preferred that, following the image selection step e), the handicap value assigned to the collection from which the image has been selected in the image selection step e) is adjusted in the same sense as the sense in which the handicap value was adjusted in the adjustment step d) so as to adjust the combined ranking score for each image in said collection, and an image having an optimum combined ranking score relative to the combined ranking scores of the other images remaining in the group is selected for display in the next available position in the order.

Further handicap value adjustment and image selection steps may be implemented until said images have all been assigned positions in the order in which the images are to be displayed for viewing.

It is further preferred that, in any handicap value adjustment step subsequent to the handicap value adjustment step d), the handicap value assigned to any collections from which an image has been selected in any image selection step other than the immediately preceding image selection step is adjusted in the opposite sense to the sense in which the handicap value was adjusted in the handicap value adjustment step d).

It is further preferred that, in any handicap value adjustment step subsequent to the handicap value adjustment step d), the handicap value assigned to any collections from which an image has been selected in any image selection step other than the immediately preceding image selection step is adjusted by being decreased by a preset amount, for example 1.

The combined ranking score for each image is advantageously obtained by combining the handicap value of the collection containing the image, a relevancy score for the image (dependent on the extent to which a descriptive text associated with the image matches a search term used in the search) and a ranking value for the image. The relevancy score can be determined by factors such as frequency (number of mentions) and location (where a word or phrase in a caption field might be considered more important than words or phrases in the general description field for example).

The ranking value may be assigned to the image by ranking on the basis of the monitored level of active interest in that image as a proportion of the number of times that the image has been viewed, or alternatively a ranking score may be assigned to the image by ranking of a series of related images of which the particular image forms a part on the basis of the monitored level of active interest in an image within that series as a proportion of the number of times that images within that series have been viewed. A series of images in this case may be images by the same photographer, an automatically selected sub-group by photographer, or a collection of images by different photographers represented by one agency. Other attributes that may be indicators associated with a grouping are colour (colour or black and white), date taken, location (geographical coordinates, orientation (portrait, landscape, square), legal status (property release, model release), image type (illustration, photograph), technique (composite, digital), or any other machine-determinable feature. The ranking of images within a series, for example of 300 images of couples holding hands in front of the Eiffel Tower, will generally differ based on past indicators of active interest in each of the images as a proportion of the number of times that the image has been viewed.

The level of active interest may be determined based on the number of purchases, or the overall value of purchases, of said image or said related images by said predetermined users. Alternatively or additionally the level of active interest may be determined based on the number of instances of viewing in detail of said image or said related images by said predetermined users. The viewing in detail of said image or images may comprise user selection of said image or one of said related images for viewing at increased size relative to other images presented in said search results. The viewing may also be in the form of transfer of the image to a lightbox, that is a tool on the website where users can place images of interest without having to put them in their shopping cart, for example so as to enable users to run multiple projects simultaneously or to email image selections to a colleague for review.

Such viewing in detail may involve the user of a client workstation, in communication with said search engine running on a network/server device which provides search results as pages of thumbnail images, clicking on a thumbnail image to view the image at "full size", and/or the user adjusting the size of the image, for instance by zooming in on the "full size" image to study the image detail on the workstation monitor. The detailed viewing may also include a user viewing factual information about the image such as photographer/author and price and availability information associated with the image, as well as making purchases.

In accordance with a second aspect, the present invention provides a processor for assigning, to each of a plurality of images within different collections in a group of images selected by a search engine, a position within an order in which the images are to be displayed for viewing, the processor comprising:

a) handicap assignment means for assigning an initial handicap value to each collection of images in the group, each collection comprising at least one image of a common origin;

b) calculating means for calculating a combined ranking score for each image in the group by combining the handicap value of the collection containing the image and a ranking value for the image;

c) selection means for selecting, for display in the first position in the order, an image having an optimum combined ranking score relative to the combined ranking scores of the other images in the group;

d) handicap assignment means for adjusting the handicap value assigned to the collection from which the selected image has been taken, after such image selection, so as to adjust the combined ranking score for each of the remaining images in said collection; and e) further selection means for selecting, after such handicap value adjustment and for display in the next available position in the order, an image having an optimum combined ranking score relative to the combined ranking scores of the other images remaining in the group.

In accordance with a third aspect, the present invention provides a computer readable storage medium incorporating a computer program for carrying out a method of assigning, to each of a plurality of images within different collections in a group of images selected by a search engine, a position within an order in which the images are to be displayed for viewing, the method the following steps:

a) assigning an initial handicap value to each collection of images in the group, each collection comprising at least one image of a common origin;

b) calculating a combined ranking score for each image in the group by combining the handicap value of the collection containing the image and a ranking value for the image;

c) selecting, for display in the first position in the order, an image having an optimum combined ranking score relative to the combined ranking scores of the other images in the group;

d) after such image selection step, adjusting the handicap value assigned to the collection from which the selected image has been taken so as to adjust the combined ranking score for each of the remaining images in said collection; and e) after such handicap value adjustment step, selecting, for display in the next available position in the order, an image having an optimum combined ranking score relative to the combined ranking scores of the other images remaining in the group.

BRIEF DESCRIPTION OF THE DRAWINGS

In order that the invention may be more fully understood, a preferred embodiment of the invention will now be described, by way of example, with reference to the accompanying drawings, in which:

FIG. 4 is a table illustrating the manner in which the combined ranking score assigned to the image collections of three suppliers may vary during successive cycles in a typical selection process; and FIG. 5 is a table of handicap lookup values.

DETAILED DESCRIPTION OF THE DRAWINGS

Figure 1:
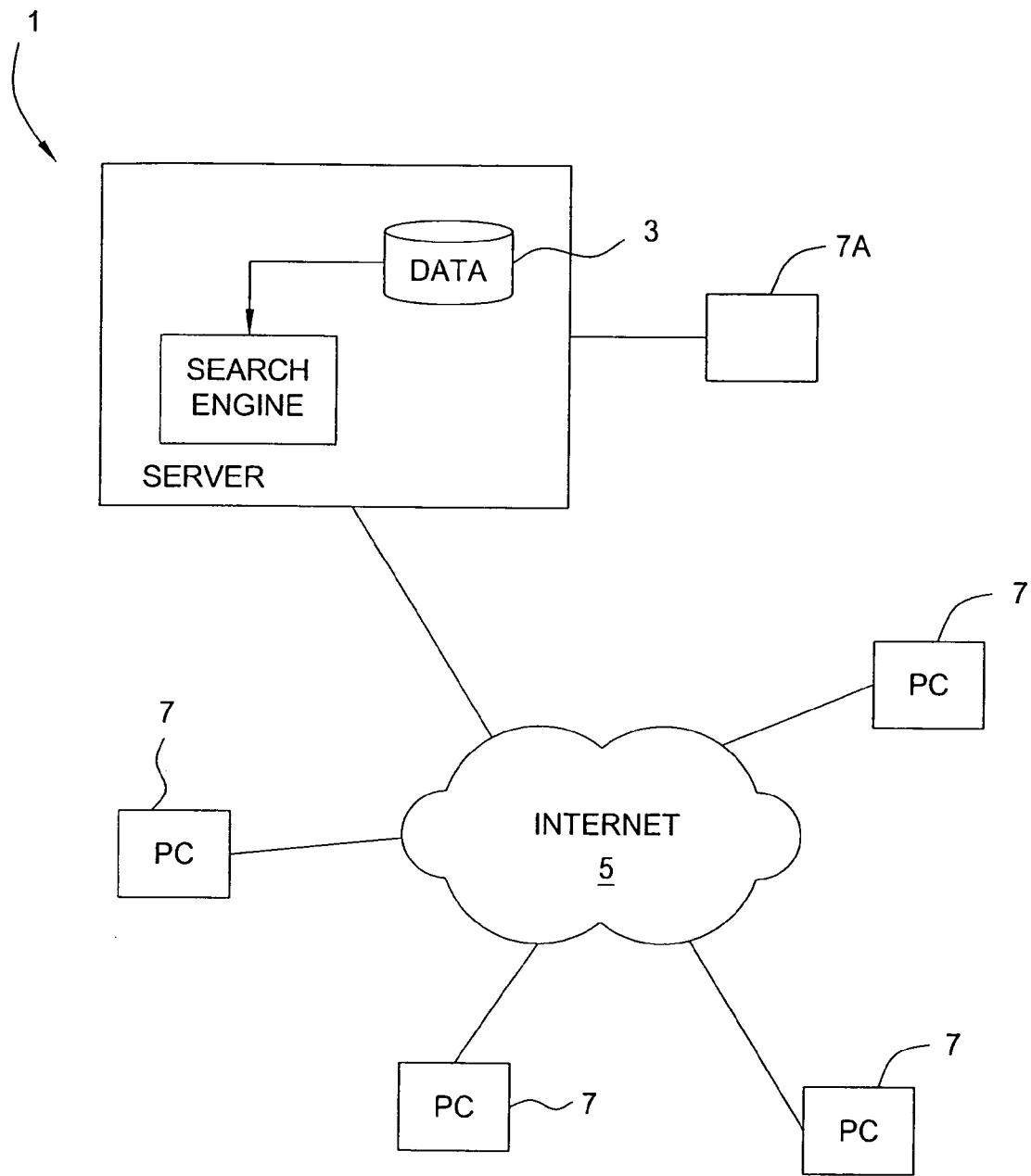
FIG. 1 is a schematic view of an image ranking processor, in accordance with the preferred embodiment, which is connected to the Internet.

FIG. 1 illustrates an image ranking processor 1 in accordance with an embodiment of the present invention. In the preferred embodiment, the processor 1 comprises, or is associated with, one or more servers of an online stock photography agency, although it will be appreciated that the present invention may be used in ranking images in other contexts, such as other image based search engines. Thus, a database 3 stores high resolution digital images I. Images I are offered to customers, namely picture buyers, such as advertising agencies, design companies and publishers, for the purchase of rights for the use thereof, and potentially for downloading the images over the Internet 5 to a customer computer 7. It will be appreciated that the images may be moving images as well as static images.

In addition, contributors or suppliers may contribute digital images I to the database 3 of images for purchase, and such contributors may send high-resolution images to the database 3 and may caption and edit new and existing images within the database 3.

The processor comprises a database for storing data relating to images (IP) and users (UP) and includes, for each image, an image profile IP comprising user input text-based information ("meta-data") and manually defined characteristics of the image. For instance, the image profile IP may include text-based keywords or "captions" for the image, such as the subject of the image. In addition, the image profile IP may contain other text-based factual information about the image, such as the author, date of the image, price and/or availability of the image. Computer-determined attributes of the image may be included in the image profile IP, such as whether the image is colour or black and white, the size of the image and the image data, the orientation of the image etc. The image profile IP may include automatically determined profile information after the image is entered in the database, such as information associated with the activity level and/or history of viewing and/or purchasing of the image or related images (such as images originating from the same photographer).

In addition, the database stores a user profile UP for each user (customer or supplier) comprising text-based information about the user. For example, for each customer user, the user profile UP may include the type of customer (e.g. advertising, design, books, newspaper or magazine publisher); the gender of the customer; the profession of the customer; the location/region of the customer; and the time of day, date and season of the search. In addition, dynamically updated, historical information about the customer's activity may be stored in the user profile UP. Importantly, this information may include a "customer importance" level, based on the type of customer and history of purchasing images.

Furthermore the diversity of search results is regulated by a handicap system by which a handicap score is assigned to the collection of images supplied by an image supplier in a group of images returned as a result of the search. The handicap score is characterised by a handicap value that can be obtained either through a look-up table with a decaying function built-in, or through an algorithm with a decaying function built-in. This means that the handicap value can either be calculated (using an algorithm) or looked up (using a table). The use of a decaying function enables the system operator to adjust the degree to which the handicap is enforced, for example by controlling when an image from a supplier's collection from which an image has already been selected for presentation is next to be presented.

There may be multiple implementations of tables or algorithms and adjustments can be made to factor in variables such as the size of the supplier's image collection (a collection with a small number of images may be given a more slowly decaying handicap), the number of a supplier's images in the search results (a collection with a lot of images in the search results may be given a more quickly decaying handicap), the number of images with a high ranking value in the search results (the handicap will decay more slowly if there are many images with a high ranking value, and more quickly if there are many images with a low ranking value). Furthermore the spread of results as determined by the diversity algorithm may be made to vary from the beginning of the assignment of the images in the search results (when there are many images or collections of images from multiple suppliers left in the results) to the end of the assignment of the images in the search results (when there are not many images or collections of images left).

In the simplest form of the handicap system each collection of images is treated separately, but the diversity algorithm can also be applied to the case where there are multiple collections from the same supplier, and these multiple collections from the same supplier can then be treated by the system as though belonging to a single collection. For example there may be a need to groups multiple collections together in this way if the supplier has placed a series of similar images in multiple collections.

Figure 2:
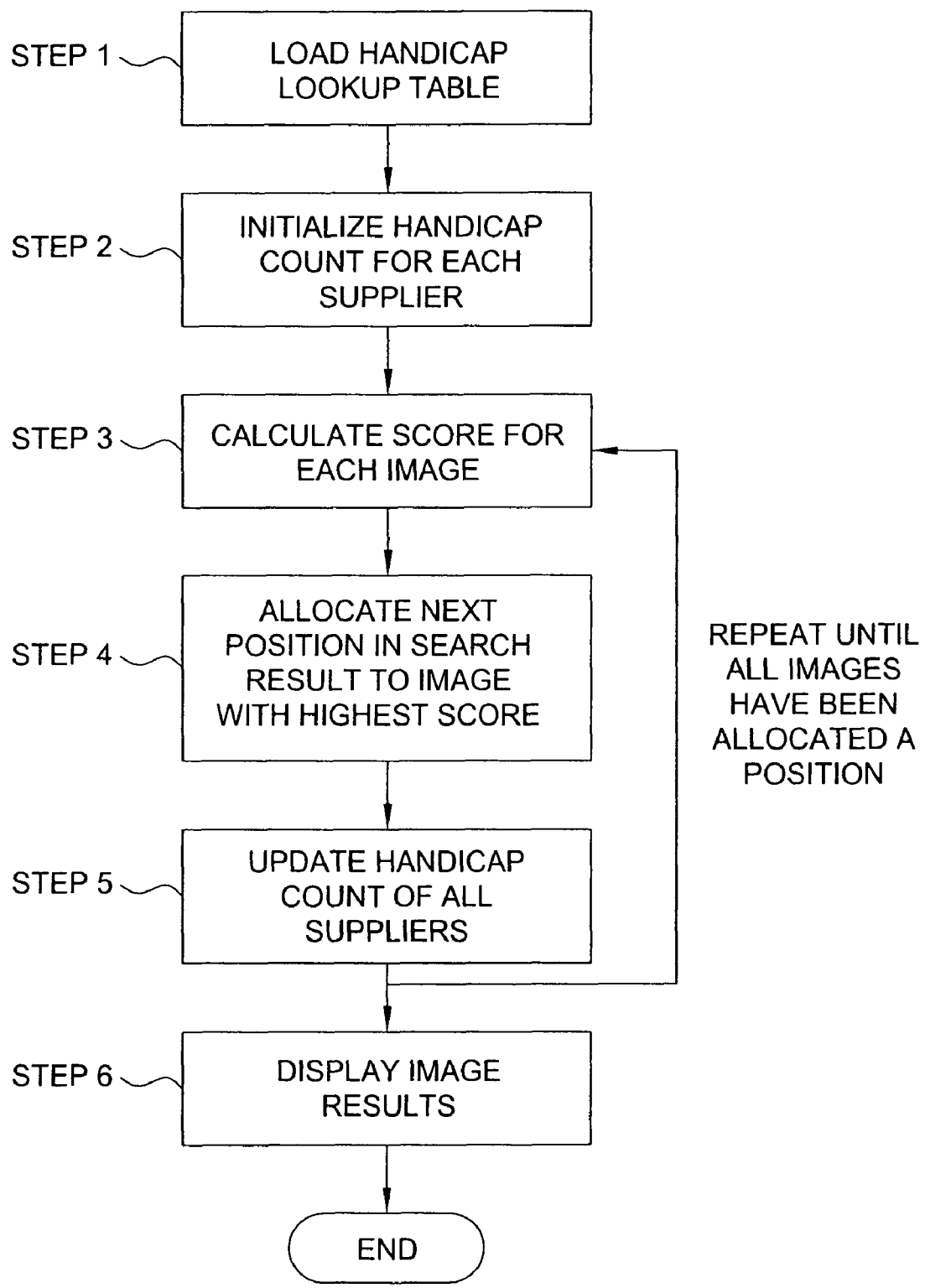
FIG. 2 is a flow diagram indicating successive steps implemented in the processor.

FIG. 2 shows a flow diagram of successive steps implemented within the processor for ordering of the images within the search results in such a way as to present the images to the customer in the optimum manner.

Step 1 Load Handicap Lookup Table

In the first step the handicap lookup table is loaded into the memory of the processor. The handicap lookup table relates handicap values (Ht) to a handicap count (H) outputted by a handicap counter for each image collection. The handicap count (H) for each collection is reset to zero each time an image from the collection is displayed and is incremented each time an image from the collection is not displayed (after an image from the collection has already been displayed).

Figure 3:
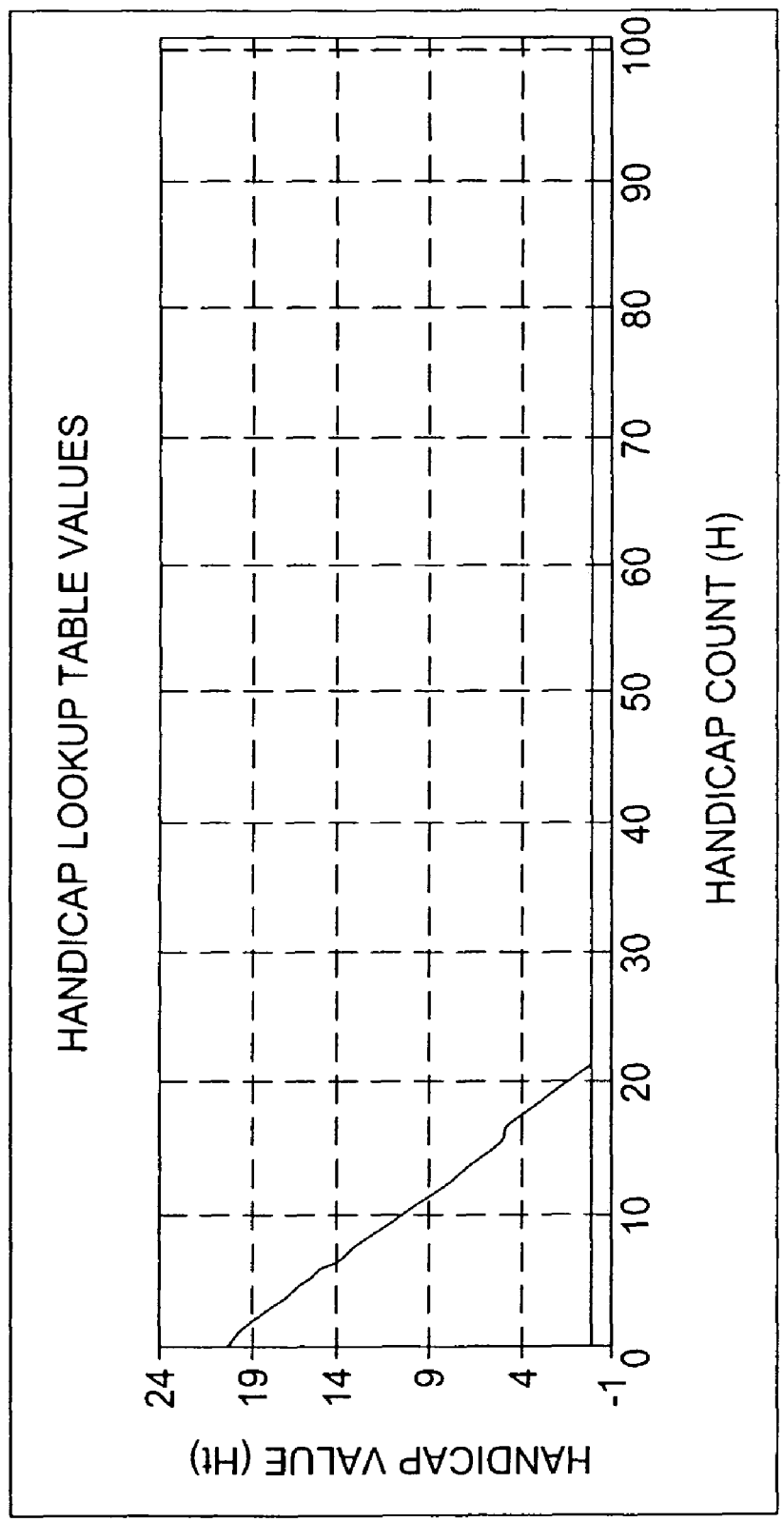
FIG. 3 is a diagram illustrating the manner in which the assigned handicap values decay over successive selection cycles.

FIG. 3 diagrammatically illustrates an exemplary handicap lookup table showing the handicap value (Ht) decreasing incrementally from a value of 20 as the handicap count (H) increases and then becoming zero when the handicap count (H) exceeds 20. FIG. 5 shows an actual lookup table.

Step 2 Initialise Handicaps

The handicap count (H) for the image collection of each supplier is assigned an initial value of 100 corresponding to a handicap value (Ht) of zero in the handicap lookup table. The counter is then cycled so as to assign a handicap value (Ht) to each collection of images in the search results each time that an image selection is made.

Step 3 Calculate Score

At each selection cycle the processor calculates a combined ranking score (CR) for each image remaining in the search results according to the relationship:

$$CR = (AR + R) - Ht$$

where AR is the ranking value for the supplier of the image collection,

R is the relevancy score for the image, and

Ht is the lookup value of the handicap of the image collection.

Step 4 Allocate Position in Search Results

The image with the highest combined ranking score (CR) calculated in this manner is then selected to be allocated the next available position in the order to be assigned to the images.

Step 5 Update Handicap

After this image selection step the counter is again cycled and the handicap count (H) for the image collection from which the image was selected in step 4 is set to zero corresponding to a handicap value (Ht) of 20. The handicap count (H) for the other image collections (from which the image was not selected in step 4) remains the same as it is still at its assigned maximum value of 100 corresponding to a handicap value (Ht) of zero.

Steps 3, 4 and 5 are repeated until all images have been allocated a position in the ordered search results. In step 5, however, the handicap count (H) for the other image collections (from which the image was not selected in step 4) is incremented by one if the current handicap count (H) for the image collection is less than 100 (as it will be in subsequent selection cycles for each image collection from which an image has been selected in previous selection cycles) and this will result in a decrease in the handicap value (Ht) by 1, for example from 20 to 19. In the image selection cycle immediately after an image has been selected from a particular image collection, the handicap count (H) for that image collection from which the image was selected in step 4 is set to zero corresponding to a handicap value (Ht) of 20.

Step 6 Display Results

The images are then displayed to the customer in the order in which they have been selected by the above described selection process.

FIG. 4 is a table illustrating the manner in which the combined ranking score assigned to the image collections of three suppliers may vary during successive cycles in a simple selection process as described above. It should be appreciated that this table is only given as an illustrative example for better understanding of the invention, and that is practice there would be a greater number of collections in typical search results and probably greater complexity in the selection process.

In the example of FIG. 4, the images in the search results are from the image collections of three suppliers A, B, C, and the table illustrates the manner in which the selection process is applied in successive selection cycles in order to assign images to positions 1 to 10 in the order in which the images are to be displayed to the customer. Initially the handicap count (H) for the image collection of each supplier is assigned a value of 100 corresponding to a handicap value (Ht) of zero, and the combined ranking score of each image is 10. For the purposes of this example only, the product of the ranking value and relevancy of each image is assumed to have a constant value of 10. In normal circumstances (where the CR scores vary) the system will display an image having the highest CR, but in this example the system randomly selects a collection for the first image (Position 1) which is an image from the collection of supplier A (as indicated by the highlighting of the CR value of that supplier).

Since an image from the collection of supplier A has been selected for position 1, the handicap counter for this collection is set to zero in the next cycle and the handicap lookup table is then used to determine the corresponding handicap value (Ht) which is 20. This results in the images in the collection of supplier A being assigned a CR of −10. Since no image from the collections of suppliers B and C have yet been displayed the handicap values (Ht) of these suppliers remain at zero corresponding to a handicap count (H) of 100 and a CR of 10.

Thus, in the selection of the next image (Position 2), an image is selected from one of the two collections having the highest CR, which we can see from the highlighted CR value is supplier B (randomly selected because the CR for suppliers B and C is equal). Since an image from the collection of supplier B has been selected for position 2, the handicap counter for this collection is set to zero in the next cycle and the handicap lookup table is then used to determine the corresponding handicap value (Ht) which is 20. This results in the images in the collection of supplier B being assigned a CR of −10. Furthermore, since an image from the collection of supplier A has previously been displayed, the handicap count (H) of this supplier is incremented by one (to 1) corresponding to a handicap value (Ht) of 19, giving a CR of −9. Since no image from the collection of supplier C have yet been displayed the handicap value (Ht) of this supplier remains at zero corresponding to a handicap count (H) of 100 and a CR of 10.

Thus, in the selection of the next image (Position 3), an image is selected from the collection having the highest CR, which we can see from the highlighted CR value is supplier C. Since an image from the collection of supplier C has been selected for position 3, the handicap counter for this collection is set to zero in the next cycle and the handicap lookup table is then used to determine the corresponding handicap value (Ht) which is 20. This results in the images in the collection of supplier C being assigned a CR of −10. Furthermore, since images from the collections of suppliers A and B have previously been displayed, the handicap count (H) of each of these suppliers is incremented by one (to 2 and 1 respectively) corresponding to handicap values (Ht) of 18 and 19, giving CR's of −8 and −9.

The following selection cycles proceed as shown in the table, until all the positions 1 to 10 have been occupied. The need to randomly select the next collection from which an image is to be selected diminishes after images from all three collections have been selected for the first time, after which the algorithm ensures that there is a fair distribution of results among the suppliers.

It will be appreciated that, in the preferred embodiment, a ranking value IR is assigned to each image or series of related images, to be used in determining the ranking of an image in a set of search results. The calculated ranking value of each image is used as a factor for determining the position that the image is placed in the displayed results of a search in which the image is identified relative to the other images. Thus, images with the highest ranking values should normally be presented ahead of images with lower ranking values, all other factors being equal.

The ranking value IR may be assigned to an image on the basis of the following expressions:

ZoomsIR=(ImageZooms/Views)×constantA

SalesIR=(ImageSales/Views)×constantB

Weighting factor=ZoomsIR/constantC

IR=SalesIR+Weighting factor

In possible variant implementations of the invention the lookup table may be such as to return different handicap values for images from the collections of different suppliers, or to return handicap values having different rates of decay. In other implementations the rate of decay of the handicap values may be varied for different searches or may be arranged to change as the selection process continues.

The invention claimed is:

1. A method of assigning, to each of a plurality of images within different collections in a group of images selected by a search engine, a position within an order in which the images are to be displayed for viewing on a display, the method comprising the following steps:
   a) assigning an initial handicap value to each collection of images in the group, each collection comprising at least one image of a common origin;
   b) calculating a combined ranking score for each image in each collection by combining the handicap value of the collection containing the image and a ranking value for the image;
   c) selecting, for display in a first position in the order, an image having an optimum combined ranking score relative to the combined ranking scores of the other images in the group;
   d) after such image selection step, adjusting the handicap value assigned to the collection from which the selected image has been taken to adjust the combined ranking score for each of the remaining images in said collection; and
   e) after such handicap value adjustment step, selecting, for display in a next available position in the order, an image having an optimum combined ranking score relative to the combined ranking scores of the other images remaining in the group,
   wherein, following the image selection step e), the handicap value assigned to the collection from which the image has been selected in the image selection step e) is adjusted in a same sense as how the handicap value was adjusted in the adjustment step d) to adjust the combined ranking score for each image in said collection, and an image having an optimum combined ranking score relative to the combined ranking scores of the other images remaining in the group is selected for display in the next available position in the order.

2. The method as claimed in claim 1, wherein, in the handicap value adjustment step d), the handicap value assigned to the collection from which the image has been selected is adjusted by being increased to a preset maximum value.

3. The method as claimed in claim 1, wherein further handicap value adjustment and image selection steps are implemented until said images have all been assigned positions in the order in which the images are to be displayed for viewing.

4. The method as claimed in claim 3, wherein, in any handicap value adjustment step subsequent to the handicap value adjustment step d), the handicap value assigned to any collections from which an image has been selected in any image selection step other than an immediately preceding image selection step is adjusted in an opposite sense as how the handicap value was adjusted in the handicap value adjustment step d).

5. The method as claimed in claim 4, wherein, in any handicap value adjustment step subsequent to the handicap value adjustment step d), the handicap value assigned to any collections from which an image has been selected in any image selection step other than the immediately preceding image selection step is adjusted by being decreased by a preset amount.

6. The method as claimed in claim 1, wherein the adjusted handicap value for each collection is derived from a handicap counter that is incremented each time that an image from the associated collection is not selected and set to zero each time that an image from the associated collection is selected during each successive selection cycle.

7. The method as claimed in claim 1, wherein the adjusted handicap value for each collection is derived from a lookup table that returns the required adjusted handicap value for each collection in response to a handicap count value.

8. The method as claimed in claim 1, wherein the adjusted handicap value for each collection is derived from a handicap algorithm.

9. The method as claimed in claim 1, wherein the adjusted handicap values returned for each collection are dependent on other factors comprising at least one of: a number of images in each collection, a number of images in the group or a number of images having a ranking value above a predetermined level.

10. The method as claimed in claim 1, wherein the ranking value for each image is determined by the steps of:
    monitoring a number of times said image or images in a series of related images are presented for viewing by predetermined users in search results conducted by the search engine,
    monitoring a level of active interest shown by said predetermined users in said image or images presented for viewing in said search results, and
    determining a ranking score for said image or images based on the monitored level of active interest as a proportion of the number of times said image or images are presented for viewing by said predetermined users.

11. The method as claimed in claim 1, wherein the images are displayed in a form of a plurality of thumbnail images on one or more displayed pages and relative positions of the thumbnail images on each page are determined by the order selected for the images.

12. An apparatus for assigning, to each of a plurality of images within different collections in a group of images selected by a search engine, a position within an order in which the images are to be displayed for viewing, the apparatus comprising:
    a processor, the processor comprising:
    a) handicap assignment means for assigning an initial handicap value to each collection of images in the group, each collection comprising at least one image of a common origin;
    b) calculating means for calculating a combined ranking score for each image in each collection by combining the handicap value of the collection containing the image and a ranking value for the image;
    c) selection means for selecting, for display in a first position in the order, an image having an optimum combined ranking score relative to the combined ranking scores of the other images in the group;
    d) handicap assignment means for adjusting the handicap value assigned to the collection from which the selected image has been taken, after such image selection, to adjust the combined ranking score for each of the remaining images in said collection; and
    e) further selection means for selecting, after such handicap value adjustment and for display in a next available position in the order, an image having an optimum combined ranking score relative to the combined ranking scores of the other images remaining in the group,
    wherein, following the image selection step e), the handicap value assigned to the collection from which the image has been selected in the image selection step e) is adjusted in a same sense as how the handicap value was adjusted in the adjustment step d) to adjust the combined ranking score for each image in said collection, and an image having an optimum combined ranking score relative to the combined ranking scores of the other images remaining in the group is selected for display in the next available position in the order.

13. A computer readable storage medium for storing a computer program that when executed by a processor performs a method of assigning, to each of a plurality of images within different collections in a group of images selected by a search engine, a position within an order in which the images are to be displayed for viewing on a display, the method the following steps:
   a) assigning an initial handicap value to each collection of images in the group, each collection comprising at least one image of a common origin;
   b) calculating a combined ranking score for each image in each collection by combining the handicap value of the collection containing the image and a ranking value for the image;
   c) selecting, for display in a first position in the order, an image having an optimum combined ranking score relative to the combined ranking scores of the other images in the group;
   d) after such image selection step, adjusting the handicap value assigned to the collection from which the selected image has been taken to adjust the combined ranking score for each of the remaining images in said collection; and
   e) after such handicap value adjustment step, selecting, for display in a next available position in the order, an image having an optimum combined ranking score relative to the combined ranking scores of the other images remaining in the group,
   wherein, following the image selection step e), the handicap value assigned to the collection from which the image has been selected in the image selection step e) is adjusted in a same sense as how the handicap value was adjusted in the adjustment step d) to adjust the combined ranking score for each image in said collection, and an image having an optimum combined ranking score relative to the combined ranking scores of the other images remaining in the group is selected for display in the next available position in the order.

* * * * *